April 7, 1970
F. T. RANDELL
3,505,173
WATER DISTILLATION PLANT
Filed Jan. 9, 1968
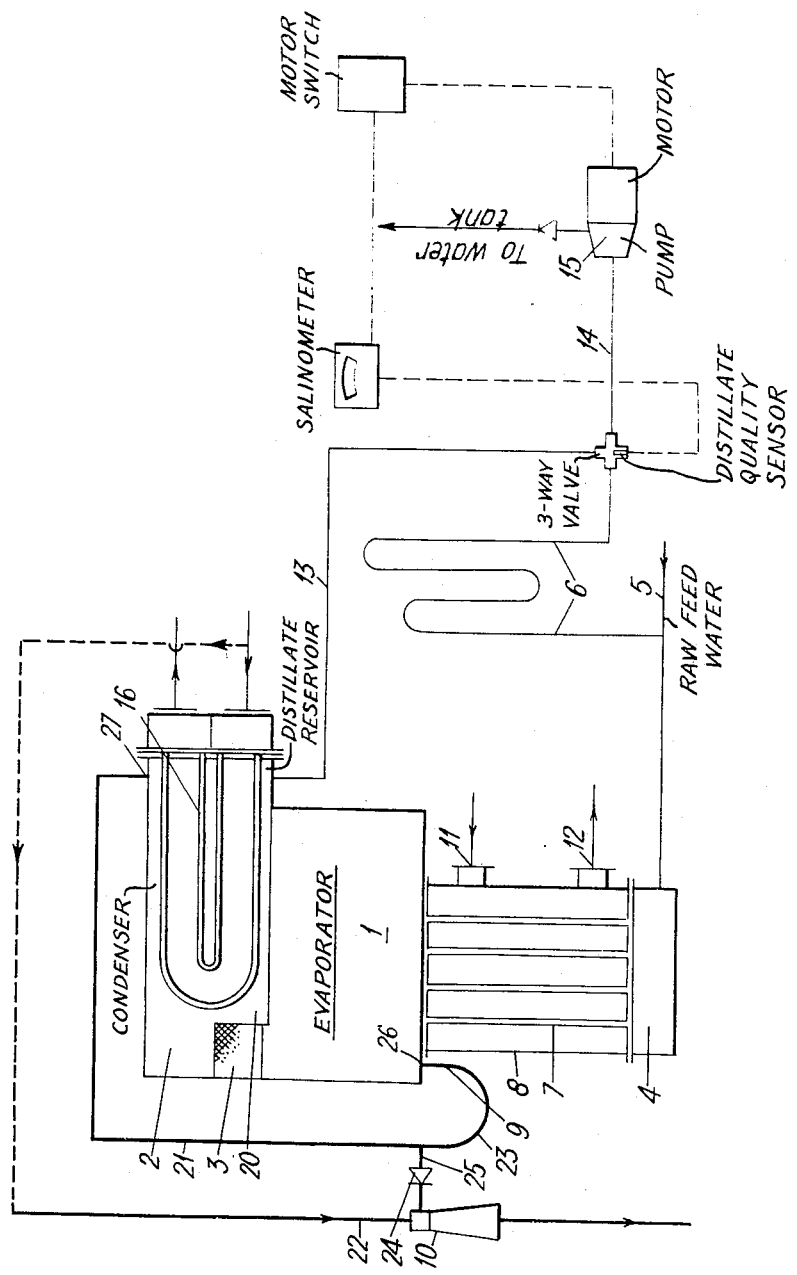
Inventor
FORREST T. RANDELL
By Mason, Fenwick & Lawrence
Attorneys United States Patent Office 3,505,173
Patented Apr. 7, 1970

3,505,173
WATER DISTILLATION PLANT
Forrest Thomson Randell, Glasgow, Scotland, assignor to G. & J. Weir Limited, Glasgow, Scotland, a British company
Filed Jan. 9, 1968, Ser. No. 696,579
Claims priority, application Great Britain, Jan. 20, 1967, 3,129/67
Int. Cl. C02b 1/06; B01d 3/42, 3/10
U.S. Cl. 202—189   4 Claims

ABSTRACT OF THE DISCLOSURE

A distillation plant has an evaporation section including conduit for throughflow of heating fluid for evaporation of the liquid to be distilled, a condensing section including conduit for cooling fluid to condense the vapour within the section, an air ejector for creating a vacuum within the sections, and an outlet from the evaporation section for the excess of liquid to be distilled. The air ejector is connected additionally to the excess liquid outlet for the removal of the excess liquid. A liquid seal is provided in the connection between the air ejector and the excess liquid outlet, the seal serving to ensure that during operation of the distillation plant the pressure within the condensing section is less than that within the evaporation section.

---

This invention relates to distillation apparatus having an evaporation section including heating means for the liquid to be distilled, a condensing section including vapour cooling means, air-ejector means for creating a vacuum within the sections, and an outlet from the evaporation section for excess liquid. Such distillation apparatus is referred to hereinafter as distillation apparatus of the type aforesaid.

It is an object of the present invention to provide means for maintaining a vacuum within and removing excess liquid from distillation apparatus of the type aforesaid by means of a common ejection arrangement.

According to the present invention in distillation apparatus of the type aforesaid the air ejector means is connected additionally to the excess liquid outlet for the removal of excess liquid and a liquid seal means for excess liquid is provided in the connection between the air ejector means and the excess liquid outlet, the seal means serving to ensure that during operation of the distillation plant the pressure within the condensing section is less than that within the evaporation section.

Preferably also the air ejector means is a liquid operable vacuum ejector pump, the cooling liquid for which is supplied from the cooling liquid supply to the condensing section.

An embodiment of the present invention will now be described merely by way of example, with reference to the accompanying drawing which is a schematic side view of distillation apparatus according to the present invention.

The illustrated distillation apparatus for producing fresh water from saline water (brine) includes a vertically disposed chamber having an evaporation section 1 situated at the base thereof and a condensing section 2 situated above the evaporation section 1. Mist separators 3 are provided at the inlet to the condensing section 2 and in the path of upflowing vapour from the evaporation section 1.

A casing 4 at the base of the evaporation section 1 provides a reservoir for liquid to be distilled, and the raw feed water inlet conduit 5 connects into the reservoir 4. A distillate overflow conduit 6 is provided connecting with the conduit 5.

A bank of vertical riser tubes 7 enclosed in a casing 8 connects the reservoir 4 with the vapour space of the evaporation section 1. Heating medium, which is preferably steam or hot water, is passed into the casing 8 through an inlet 11 circulates around the tubes 7 to cause evaporation of the brine therein and passes out again through an outlet 12.

The condensing section includes a reservoir 20 for distillate, conduits 13 and 14 connecting this reservoir 20 with pump 15. During normal operation, when the condensate is of the desired quality and pump 15 is in operation, conduit 6 will act as a gas seal between the conduits 13 and reservoir 4. When the condensate is not of the desired purity and pump 15 is out of operation, conduit 6 will allow the unsatisfactory condensate from the reservoir 20 to be fed back to the reservoir 4 for re-distillation, as is described in the applicant's co-pending U.K. patent application No. 54,704/66. The condensing section has also a bank of U-tubes 16 extending horizontally into the condensing section 2 and serves for the throughflow of cooling water.

To increase the efficiency of distillation, it is desirable that a vacuum be maintained within the housing of the distillation apparatus. To create and maintain this vacuum, an air ejector 10 is connected by conduit 21 to the condensing section 2 of the chamber at an appropriate air suction point 27 at a point above the water level of the distillate reservoir 20, such that substantially all the vapour will have condensed before reaching that point. It is arranged therefore that by means of suitable baffling (not shown), the vapour must pass over the complete bank of condensing tubes 16 within the condensing section 2 before the vapour can reach the air suction point 27. The vacuum is created by the kinetic energy in the operating water of the ejector, this water being delivered to the ejector 10 via the conduit 22. The operating water could be taken from the cooling water flow to the condensation section 2 of the distillation apparatus, and the connection between the condensing cooling water inlet and the ejector inlet for this arrangement is shown in dashed lines in the drawing.

The ejector 10 also serves for the withdrawal of excess brine from the vapour space of the evaporation section 1, conduit 9 connecting to an outlet 26 of the vapour space the ejector 10. A seal of excess liquid from the evaporation is provided in this latter conduit 9 and is arranged to ensure that no vapour can be drawn from the evaporation section 1, and also that there is a greater vacuum within the condensing section 2 than within the evaporating section 1 of the distillation apparatus. A U-portion 23 of the conduit 9 accommodates this liquid seal. Consequently, the vapour produced flows readily from the evaporation section 1 to the condensation section 2. A non-return valve 24 is provided in the conduit 25 leading to the ejector 10 to prevent any sucking back of brine from the ejector 10.

In operation of the distillation apparatus, the vacuum ejector 10 operates to create a vacuum within the chamber; brine is evaporated in the evaporation section 1 and the vapour produced driven off upwards through the mist separators 3 wherein impurities are removed; the purified vapour is passed into the condensing section 2 whereat the vapour is condensed; and distillate produced being collected in the distillate reservoir 20. Excess brine in the vapour space is withdrawn by the vacuum ejector 10 and discharged to waste. The liquid serves also to ensure that a greater vacuum is maintained within the condensing section 2 than within the evaporation section 1.

By use of the above-described apparatus, it is possible to dispense with one of the mechanical suction pumps (or vacuum ejectors) required for the separate discharge of air from the chamber and the discharge of excess brine from the drain respectively. The use of only one ejector (or pump) allows considerable saving in power.

I claim:

1. Distillation apparatus including casing means housing heating means for the liquid distilland, an evaporation section disposed above said heating means and a condensing section communicating with said evaporation section and a vapour space thereabove, an outlet from the evaporation section for excess distilland, a primary conduit disposed adjacent to the evaporation section and communicating at its lower end with said outlet and at its upper end with said vapour space above the condensing section, air ejector means connected to said casing and communicating with said primary conduit means for creating a vacuum within the sections, branch conduit means from said primary conduit means and communicating with the excess distilland outlet for removal of the excess distilland by the air ejector, said branch conduit means including a U-shaped section at the lower end of said primary conduit and which section connects with said excess distilland outlet for retaining a quantity of distilland in said U-shaped section to provide a liquid seal means to ensure that, during operation of the distillation apparatus, the pressure within the condensing section is less than that within the evaporation section, the outer end of said branch conduit being connected to the suction inlet of said ejector.

2. Distillation apparatus according to claim 1, wherein the air ejector means is a liquid operable vacuum ejector pump.

3. Distillation apparatus according to claim 1, in which the liquid for the air ejector is supplied from the cooling liquid supply to the condensing section.

4. Distillation apparatus according to claim 1, wherein the condensing section includes a reservoir for distillate, and the primary conduit means is connected to the condensing section at a point above the distillate reservoir.

References Cited

UNITED STATES PATENTS

| | | | |
|---|---|---|---|
| 2,388,328 | 11/1945 | Jacocks | 203—11 X |
| 2,759,882 | 8/1956 | Worthen et al. | 203—11 |
| 3,102,083 | 8/1963 | Adams | 202—205 |
| 3,192,130 | 6/1965 | Pottharst | 202—160 X |
| 3,235,469 | 2/1966 | Parke | 202—206 X |
| 3,248,305 | 4/1966 | Williamson | 202—180 |
| 3,288,685 | 11/1966 | Kemper et al. | 203—11 |
| 3,293,151 | 12/1966 | Holzer et al. | 202—205 |
| 3,326,778 | 6/1967 | Mock | 203—11 |

FOREIGN PATENTS 549,820   12/1942   Great Britain.

NORMAN YUDKOFF, Primary Examiner

F. E. DRUMMOND, Assistant Examiner

U.S. Cl. X.R.

202—205; 203—3, 11